United States Patent [19]

Yamada et al.

[11] Patent Number: 4,460,936

[45] Date of Patent: Jul. 17, 1984

[54] CONDENSER

[75] Inventors: Kuniharu Yamada; Yoshiyuki Gomi; Tsuneo Handa, all of Suwa, Japan

[73] Assignee: Kabushiki Kaisha Suwa Seikosha, Tokyo, Japan

[21] Appl. No.: 231,062

[22] Filed: Feb. 3, 1981

Related U.S. Application Data

[63] Continuation of Ser. No. 17,996, Mar. 7, 1979, abandoned.

[30] Foreign Application Priority Data

Mar. 3, 1978 [JP] Japan .................................. 53-25685

[51] Int. Cl.³ .............................................. H01G 1/01
[52] U.S. Cl. .................................... 361/305; 361/320; 361/321
[58] Field of Search ......................... 361/321, 320, 305

[56] References Cited

U.S. PATENT DOCUMENTS 2,946,937  7/1960  Herbert ............................... 361/321
3,255,395  6/1966  Fabricius ............................ 361/321
3,920,781  11/1975 Eror .................................. 361/321 X
4,086,649  4/1978  Hanold ............................... 361/321
4,097,911  6/1978  Dorrian .............................. 361/321

FOREIGN PATENT DOCUMENTS 1117766 11/1961 Fed. Rep. of Germany ...... 361/321

Primary Examiner—R. R. Kucia
Attorney, Agent, or Firm—Blum, Kaplan, Friedman, Silberman and Beran

[57] ABSTRACT

A condenser including a dielectric material exhibiting a ferroelectric phase wherein the dielectric constant-temperature characteristic of the condenser exhibits hysteresis loss of not more than 5% is provided. The dielectric constant-temperature characteristics are varied by regulating the particle diameter of the crystal and by providing an electrode material which reduces the loss. Hysteresis loss may also be reduced by including an oxide of a rare earth element or a metallic element of Group Va of the Periodic Table into a barium titanate dielectric component system.

10 Claims, 2 Drawing Figures

CONDENSER

CROSS-REFERENCE TO RELATED APPLICATION

This is a continuation of application Ser. No. 17,996, filed on Mar. 7, 1979, and now abandoned.

BACKGROUND OF THE INVENTION

This invention relates generally to a condenser, and more particularly to a condenser including a dielectric material having a ferroelectric phase. Recently, with the development of electronic techniques, there has been a substantial conversion to integrated circuits (IC). This conversion is marked by a rapidly increasing demand for condensers and other passive electric parts. Most important, ceramic condensers are desirable because they have a high capacitance per unit volume and provide high reliability. Thus, ceramic condensers are widely used and are essential elements for electronic circuits.

Ceramic dielectrics are suitable for use in temperature compensating condensers because of the paraelectric phase. However, in condensers having a high dielectric constant, many problems are encountered in accuracy. Moreover, other problems arise because it usually requires use of both the ferroelectric phase and the paraelectric phase with a substantial influence of the ferroelectric phase in precision circuits. For example, in the case of a barium titanate condenser utilized in a quartz crystal timepiece, various temperature characteristics of the dielectric constant are obtained depending on the addition of materials such as $BaSnO_3$, $SrTiO_3$, $CaTiO_3$, or $MgTiO_3$ to the $BaTiO_3$. These materials are added so that the condenser is adapted to match the temperature characteristics of frequency of the crystal oscillator in the timepiece. Accordingly, it is desirable to provide an improved condenser having a dielectric constant-temperature characteristic exhibiting reduced hysteresis.

SUMMARY OF THE INVENTION

Generally speaking, in accordance with the invention, the condenser including a dielectric material having a ferroelectric phase with a dielectric constant-temperature characteristic exhibiting hysteresis of not more than 5% is provided. Reduced hysteresis is obtained by regulating the particle diameter of the crystal dielectric and providing an electrode material which reduces the hysteresis effect of the temperature characteristic of the dielectric constant.

In one embodiment of the invention, dielectric loss due to hysteresis is reduced by disposing electrodes on the dielectric selected from the group of materials having a low coefficient of thermal expansion, and preferably a coefficient approximately that of $BaTiO_3$. Preferably, these materials are chromium or chromium alloys, $SnO_2$, $In_2O_3$, and carbon. In another embodiment of the invention an oxide of a rare earth element or a metallic element of Group Va of the Periodic Table is added to a barium titanate dielectric component system. When a rare earth element is added, a symmetrical dielectric constant-temperature characteristic curve is obtained. Reduced hysteresis loss is also obtained when the particle diameter of the crystal is between 0.5 to 1.5μ.

Accordingly, it is an object of this invention to provide an improved condenser having a dielectric constant-temperature characteristic exhibiting hysteresis loss of not more than 5%.

Another object of the invention is to provide an improved condenser including a dielectric composition exhibiting a ferroelectric phase.

Still a further object of the invention is to provide an improved condenser including a dielectric composition having a ferroelectric phase with the dielectric constant-temperature characteristic exhibiting hysteresis of not more than 5%.

Still another object of the invention is to provide an improved condenser suitable for use in a temperature compensating circuit for a quartz crystal oscillator.

Yet a further object of the invention is to provide improved ceramic dielectric material compositions exhibiting reduced hysteresis.

Yet another object of the invention is to provide an improved ceramic condenser including a barium titanate dielectric.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
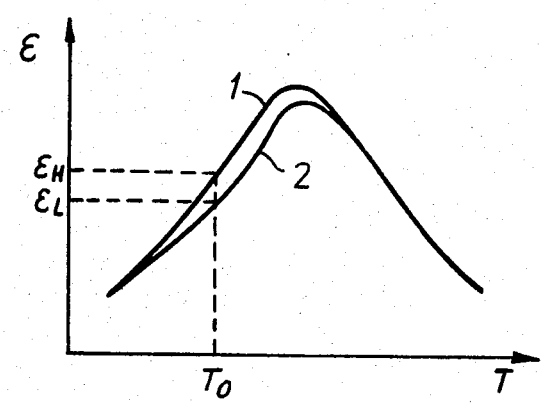
FIG. 1 is a graphical illustration of the dielectric constant-temperature characteristics of a conventional condenser.
Figure 2:
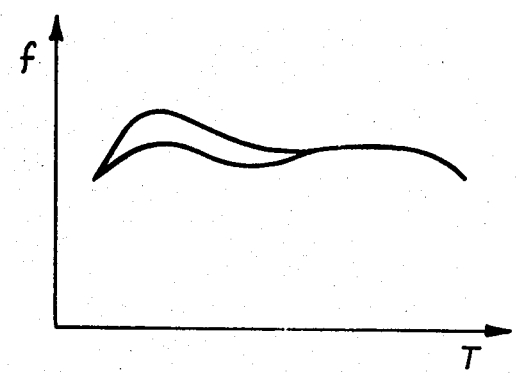
FIG. 2 is an illustration of the frequency-temperature characteristics of a quartz crystal oscillator utilized in an electronic timepiece.

Referring now to FIG. 1, a dielectric constant-temperature characteristic curve of a conventional barium titanate condenser is illustrated. A first peaked curve 1 is obtained by measuring dielectric constant as the temperature is decreased. A second peaked curve 2 is obtained when dielectric constant is measured as the temperature increases. First curve 1 and second curve 2 demonstrates that a hysteresis effect of temperature on the dielectric constant exists in the ferroelectric phase at temperatures not lower than the Curie point. If the temperature characteristic of frequency of a crystal oscillator is adjusted, curves exhibiting the hysteresis effect as shown in FIG. 2 can be obtained. Existence of the hysteresis effect is illustrated in the curves of FIG. 2. It is difficult to obtain highly precise signals from the oscillator. Therefore, it is desirable to provide a condenser having reduced hysteresis for use in temperature compensating circuits.

Hysteresis, as illustrated in FIG. 1, is defined by the following formula $$\frac{\epsilon_H - \epsilon_L}{\epsilon_L} \times 100$$

wherein $\epsilon_H$ and $\epsilon_L$ are maximum and minimum dielectric constants at an arbitrary temperature $T_0$, respectively. Reduction of hysteresis effect is obtained with a condenser constructed and arranged in accordance with the invention by regulating the crystal particle diameter and proper selection of electrode material.

The invention will be described in more detail by way of the following examples. Comparisons with conventional condensers will be shown.

EXAMPLE 1

The hysteresis effect for a condenser having a high dielectric constant was measured. The results are set forth in the following Table:

| Main Component | Rate of Change % | Hysteresis % |
| --- | --- | --- |
| $BaTiO_3/BaSnO_3$ | 80 | 12 to 20 |
| $BaTiO_3/BaSnO_3$ | 60 | 12 to 18 |
| $BaTiO_3/SrTiO_3$ | 70 | 15 to 22 |
| $BaTiO_3/SrTiO_3$ | 50 | 13 to 18 |
| $BaTiO_3/BaZrO_3$ | 40 | 11 to 17 |
| $BaTiO_3/BaZrO_3$ | 30 | 12 to 20 |

The rate of change set forth in the above Table is represented by the following formula:

$$\frac{\epsilon_C - \epsilon_X}{\epsilon_C} \times 100, \text{ wherein}$$

$\epsilon_C$ is the dielectric constant at the Curie point and $\epsilon_X$ is the dielectric constant at a temperature 20° C. below the Curie point. Based on the results set forth in the Table, it is clear that conventionally available condensers generally have a hysteresis effect greater than 10%.

EXAMPLE 2

An aqueous solution of polyvinyl alcohol (PVA) is added to a conventional dielectric material composition. The composition is granulated and shaped into a biscuit by pressing the material under a pressure of between 1 to 2 tons/cm². Following pressing, the material is sintered between 1200° to 1400° C. for three hours. A Pd-Ag paste is baked on the porcelain biscuit and the dielectric-temperature characteristics are measured.

The results are the same as those obtained in Example 1 as the condensers of various component systems exhibit a hysteresis of more than 10%. In addition, when the porcelain biscuit obtained by sintering was ground, the particle diameter of the crystal was measured. This value was between 2 to 3μ.

EXAMPLE 3

Several compositions were prepared as follows. $BaCO_3$ and $TiO_2$, $SrCO_3$ and $TiO_2$, $BaCO_3$ and $SnO_2$, $BaCO_3$ and $ZrO_2$, $CaCO_3$ and $TiO_2$, and $MgCO_3$ and $TiO_2$ were mixed in 1:1 molar ratios. The compositions were wet mixed in a pot mill for twenty-four hours. After drying the compositions, calcination was carried out at 1000° to 1200° C. for two hours. Some of the $BaTiO_3$, $SrTiO_3$, $BaSnO_3$ and $MgTiO_3$ material obtained was mixed in various ratios. The process described in Example 2 was followed for determining the electrical characteristics of the compositions. In addition, a $BaTiO_3$-$SrTiO_3$ system was prepared by wet mixing $BaCO_3$, $SrCO_3$ and $TiO_3$ in predetermined molar ratios.

In each of the component systems prepared in accordance with this example, the composition exhibited a hysteresis effect of more than 10%. Moreover, in each case, the particle diameter of the resulting crystal was between 3 and 10μ in diameter. This demonstrates a remarkable crystal growth compared with the compositions of Example 2. It is believed that this crystal growth is due to the use of different minerals.

The following Examples 4–8 illustrate condenser materials in accordance with the invention.

EXAMPLE 4

A porcelain biscuit made from conventional condenser material was formed in the same manner and described in the procedures in connection with Example 2. Another sample composition was made by wet mixing and calcinating $BaCO_3$, $TiO_2$, $SrCO_3$ in the same manner as described in connection with Example 3. Samples of these biscuits were coated with Au or Cr as an electrode by vacuum evaporation and the electrical characteristics were measured.

The results illustrate that for each of the component systems the hysteresis effect was from 12 to 20% for the Au electrode and from 3 to 6% for the Cr electrode. It is believed that this result is obtained due to the fact that Cr is a member of a group of metals having the lowest coefficient of thermal expansion which approximates that of $BaTiO_3$. However, it should be noted that the thermal expansion coefficient of the porcelain is generally less than that of the metal electrodes.

The thermal expansion coefficient of a barium titanate condenser was measured and a chromium alloy having a thermal expansion coefficient approximately the same was made. This chromium alloy was spattered onto the surfaces of the biscuits and the hysteresis was reduced to a level between 3 to 5%. Additional transparent electrodes made from metal oxides having thermal expansion coefficients approximately equal to that of barium titanate condenser were also made. These included $SnO_2$ and $In_2O_3$. A carbon electrode having a thermal expansion coefficient less than that of the metal electrodes was also effective for reducing the hysteresis effect.

EXAMPLE 5

Into a main component system of $BaCO_3$-$TiO_2$-$SrCO_3$ and $BaCO_3$-$TiO_2$-$SnO_2$, 0.01% by weight of a rare earth metal oxide. $Dy_2O_3$ was added. The mixture was wet mixed in a pot mill for twenty-four hours. After drying the composition, calcination was carried out between 1000° to 1200° C. for two hours. The calcinated product was ground and an aqueous PVA solution was added. After granulating, sintering was carried out at 1300° to 1500° C. for three to five hours. A Pd-Ag paste was baked on the surfaces to serve as an electrode and the electrical characteristics were measured. The hysteresis effect of these condensers including the rare earth metal oxide was not more than 5% and the crystal diameter was not more than 1μ.

In addition, when the rare earth metal oxide was added to the dielectric material, the temperature-dielectric constant characteristic curve became more symmetrical. This improvement results in a generally superior condenser.

EXAMPLE 6

The procedure of Example 5 was followed and an oxide of a metallic element of Group Va of the Periodic Table was added. Specifically, $V_2O_5$ and $Nb_2O_5$ was added to different samples and the mixtures were wet mixed in a pot mill for 24 hours. After drying, calcination was carried out at 1000° to 1200° C. for two hours. The calcinated products were ground and an aqueous PVA solution was added. After granulating, sintering was carried out between 1300° to 1500° C. for three to five hours. A Pd-Ag paste was baked on to serve as an electrode and the electrical characteristics were measured.

In each case, hysteresis was not more than 5% when the dielectric material included an oxide of the metallic elements of Group Va of the Periodic Table.

EXAMPLE 7

An aqueous PVA solution is added to a conventional condenser dielectric material. After granulating, shaping is carried out by pressing the grains under pressure of 0.5 to 2 tons/cm$^2$. The material and $ZrO_2$ powder as a medium of pressure was placed in a cavity of $Al_2O_3$, followed by hot-press sintering at 1000° to 1300° C. for one to three hours. A Pd-Ag paste was baked on to serve as an electrode and the electric characteristics were measured. The hysteresis was between 2 to 5% and the particle diameter of the crystal was 0.5 to 1.5$\mu$. As a result, condensers having improved aging characteristics were obtained.

Application of the invention is not limited to the above-described embodiments utilizing generally available $BaTiO_3$ condensers but can also be applied to other ceramic dielectrics possessing a ferroelectric phase. In addition, the invention may be applied to a ferroelectric single crystal such as TGS and SbSI. Furthermore, the condensers made in accordance with the invention can be utilized as effective electrical elements in a wide range of electrical circuits, not only in oscillation circuits for a quartz crystal timepiece. Such circuits include communication apparatus and precision instrumentation requiring standard signals.

Accordingly, an improved condenser is provided by forming a dielectric material having a ferroelectric phase and a dielectric constant-temperature characteristic exhibiting hysteresis of not more than 5%. This is accomplished by regulating the particle diameter of the crystal by inclusion of specified oxide materials or properly selecting an electrode material which has a temperature expansion coefficient approximately that of the dielectric material.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A condenser having a hystersis effect of dielectric constant-temperature characteristic of less than 5%, comprising a barium titanate ceramic dielectric including a main component system selected from the group consisting of $BaCO_3$-$TiO_2$-$SrCO_3$ and $BaCO_3$-$TiO_2$-$SnO_2$ including from about 0.01 to 1% by weight of at least one oxide selected from the group consisting of an oxide of a rare earth element and an oxide of a metallic element of Group Va of the Periodic Table.

2. The condenser of claim 1, wherein said at least one oxide is an oxide of a rare earth element.

3. The condenser of claim 2, wherein said main component system is $BaCO_3$-$TiO_2$-$SrCO_3$.

4. The condenser of claim 2, wherein said main component system is $BaCO_3$-$TiO_2$-$SnO_2$.

5. The condenser of claims 2, 3 or 4, wherein said oxide of a rare earth element is $Dy_2O_3$.

6. The condenser of claim 1, wherein the diameter of the crystal of said dielectic material is not more than 1.5$\mu$.

7. The condenser of claim 1, wherein said at least one oxide is an oxide of a metallic element of Group Va of the Periodic Table.

8. The condenser of claim 7, wherein said oxide of a metallic element is $V_2O_5$.

9. The condenser of claim 7, wherein said oxide of a metallic element is $Nb_2O_5$.

10. The condenser of claim 1, wherein the dielectric has external exposed surfaces with at least a portion of said external surfaces having an electrode selected from the group consisting of Cr, $SnO_2$, $In_2O_3$, chromium alloys and carbon disposed thereon by one of vacuum evaporation and spattering.

* * * * *